US009792453B2

(12) United States Patent
Challener et al.

(10) Patent No.: US 9,792,453 B2
(45) Date of Patent: Oct. 17, 2017

(54) REMOTE COMPUTER LOCKDOWN

(75) Inventors: David Carroll Challener, Raleigh, NC (US); Daryl Cromer, Cary, NC (US); Howard Locker, Cary, NC (US); Randall Scott Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1593 days.

(21) Appl. No.: 11/861,597

(22) Filed: Sep. 26, 2007

(65) Prior Publication Data

US 2009/0083555 A1    Mar. 26, 2009

(51) Int. Cl.
*G06F 21/62* (2013.01)
*G06F 21/74* (2013.01)
*H04L 29/06* (2006.01)

(52) U.S. Cl.
CPC .......... *G06F 21/6209* (2013.01); *G06F 21/74* (2013.01); *H04L 63/1441* (2013.01); *G06F 2221/2103* (2013.01); *G06F 2221/2105* (2013.01)

(58) Field of Classification Search
CPC .................................................. G06F 21/6209
USPC ................................. 713/300, 310; 709/217
See application file for complete search history.

(56) References Cited

U.S. PATENT DOCUMENTS

| 5,987,609 | A   | * | 11/1999 | Hasebe ......................... 726/35 |
| 6,119,228 | A   | * | 9/2000  | Angelo et al. ................ 713/180 |
| 6,311,276 | B1  | * | 10/2001 | Connery et al. .................. 726/2 |
| 6,424,841 | B1  | * | 7/2002  | Gustafsson .................... 455/466 |
| 6,760,850 | B1  | * | 7/2004  | Atkinson et al. ............. 713/320 |
| 6,833,787 | B1  | * | 12/2004 | Levi ......................... 340/539.13 |
| 7,725,099 | B2  | * | 5/2010  | Joho et al. ................... 455/411 |
| 2002/0097876 | A1 | * | 7/2002  | Harrison ....................... 380/270 |
| 2002/0186845 | A1 | * | 12/2002 | Dutta et al. ................... 380/247 |
| 2003/0013491 | A1 | * | 1/2003  | Moriki ......................... 455/564 |
| 2003/0088633 | A1 | * | 5/2003  | Chiu et al. .................... 709/206 |
| 2003/0145090 | A1 | * | 7/2003  | Ostergaard .................... 709/229 |
| 2005/0073389 | A1 | * | 4/2005  | Chandley .................... 340/5.31 |
| 2005/0221800 | A1 | * | 10/2005 | Jackson et al. ............... 455/411 |
| 2006/0031399 | A1 | * | 2/2006  | Sherman et al. ............. 709/217 |
| 2006/0071753 | A1 | * | 4/2006  | Lamar ........................... 340/5.6 |
| 2008/0115226 | A1 | * | 5/2008  | Welingkar et al. ............ 726/28 |

* cited by examiner

*Primary Examiner* — Kim Huynh
*Assistant Examiner* — Brandon Kinsey
(74) *Attorney, Agent, or Firm* — Ference & Associates LLC

(57) ABSTRACT

A method and system are disclosed for placing a computer in a safe and secure lock down state from a remote location using a remote command device such as a cellular telephone. The method and system includes optional security provisions before restarting the computer.

17 Claims, 2 Drawing Sheets

REMOTE COMPUTER LOCKDOWN

BACKGROUND OF THE INVENTION

Field of the Invention

The present invention generally relates to locking-down a digital data processor remotely via a handheld communication device.

Description of the Related Art

Users of computers normally lock-down their computers to a safe and secure state at the conclusion of their workday or if they plan to be away from the computer for a period of time. Sometimes a computer user may unexpectedly find it inconvenient or impossible to return to the computer to perform the lock-down procedure when described. Alternatively, if the computer were stolen, it would be impossible to place it in a safe and secure lock-down state that would prevent the compromise of stored data and software.

SUMMARY OF THE INVENTION

It is observed, by the inventors, that it would be desirable to have a means for remotely placing the computer into a safe and secure state in situations where the user finds it difficult, inconvenient or impossible to physically access the computer.

Embodiments herein described include a method comprising: receiving at a network client system, having an a unique number associated with the client system, by way of a telephone network, a remotely transmitted data packet comprising a free text potion; determining if the free text potion of the remotely transmitted data packet includes the unique number associated with the client system; and locking-down the network client system if the data packet comprises the unique number associated with the client system.

Embodiments also include apparatus comprising: an electronic memory which stores data and executable software code; a network interface component which detects the remotely transmitted data packet, and has a communications network interface; a processor, operatively connected to the network interface component, which has an a unique number associated with the processor, and which executes the executable software code, determines if a remotely transmitted data packet has been received, and lock-down the processor if the remotely transmitted data packet includes the unique number associated with the processor.

Further embodiments include a computer-usable medium having computer readable instructions stored thereon for execution by a processor to perform comprising: receiving at a network client system, having an a unique number associated with the client system, by way of a telephone network, a remotely transmitted data packet comprising a free text potion; determining if the free text portion of the remotely transmitted data packet includes the unique number associated with the client system; and locking-down the network client system if the data packet comprises the unique number associated with the client system.

DETAILED DESCRIPTION

Figure 1:
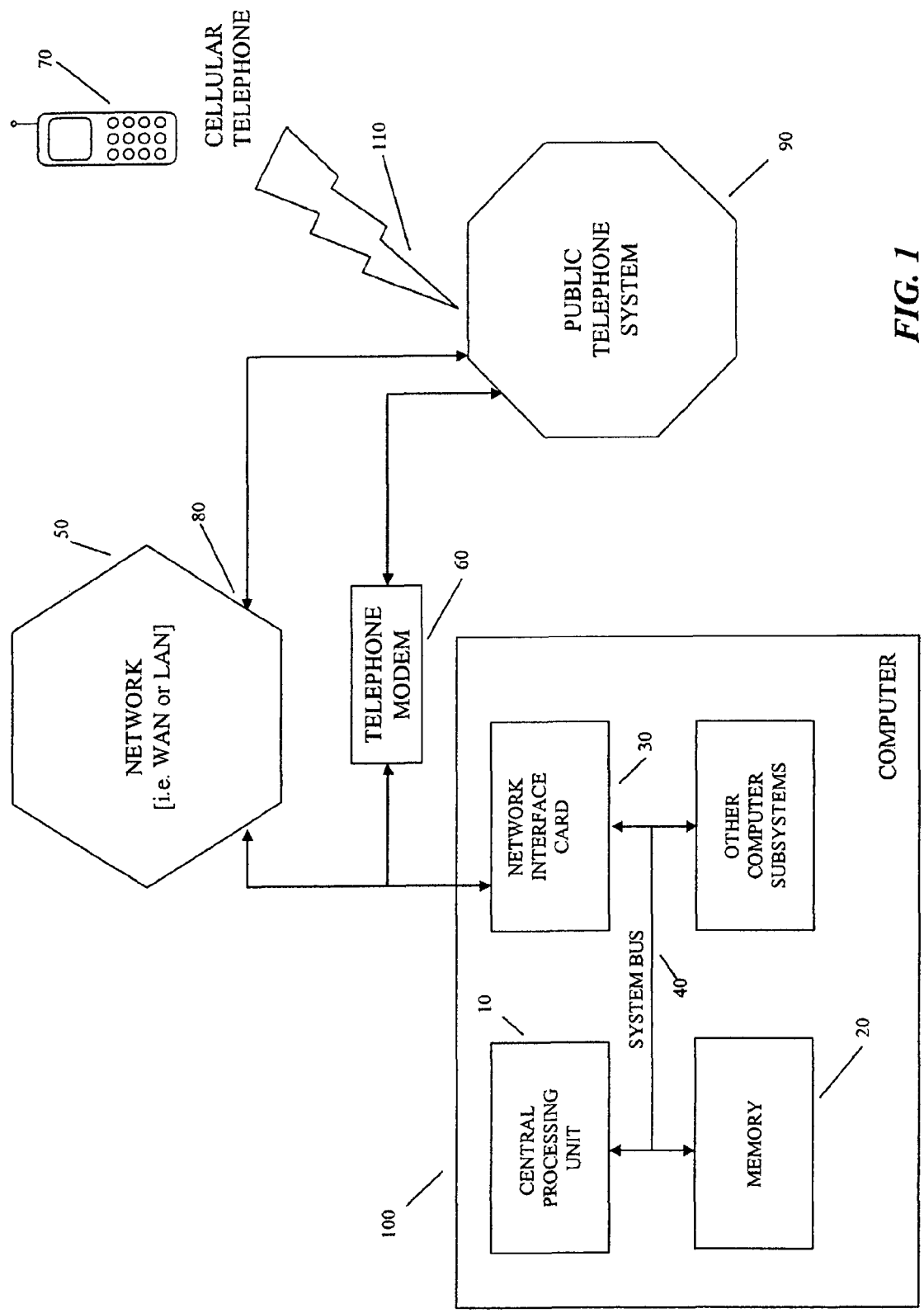
FIG. 1 is a simplified schematic presentation of the computer, a cellular telephone used as a remote command device and the interconnection facilities.

Referring to FIG. 1, a simplified example of conventional personal computer architecture 100 is schematically presented. The architecture comprises a central processing unit (CPU) 10, a system memory 20, and a network interface card 30, interconnected by a system bus 40. The network interface card 30 connects with the external network 50 of other network nodes such as a local area network (LAN) or wide area network (WAN). In another embodiment, the network interface card 30 may, in addition, connect to a telephone modem 60 for directly accessing the public telephone system 90 The interface with the public telephone system 90 can, thereby, provide connectivity between any cellular, wireless or wired telephone device 70 and the computer's network interface card 30. Similarly, this connectivity may be indirectly provided by way of the computer network 50 if the network has a portal 80 with the public telephone system 90.

The computer 100 will typically be in one of four states at the time remote lock-down is desired designated as S0 (operating system running), S3 (suspend), S4 (hibernate), or S5 (off). It is assumed that the user is uncertain of the current state. Sending the remote lock-down command should thus take the appropriate action regardless of the initial computer state. With respect to system security, Power On Password (POP) protection is typically employed while Privilege Access Password or Admin Password and Hard Disk Password (HDP), although available are seldom utilized.

The system to enable remote lock-down of the computer is comprised of the target computer 100 including a network interface card 30, a remote command device 70 such as a cellular telephone, a network or other communications means to provide remote connectivity between the computer's network interface card and the remote command device. Additionally, the computer includes algorithmic processes or programs stored in the computers memory to implement the necessary action.

Figure 2:
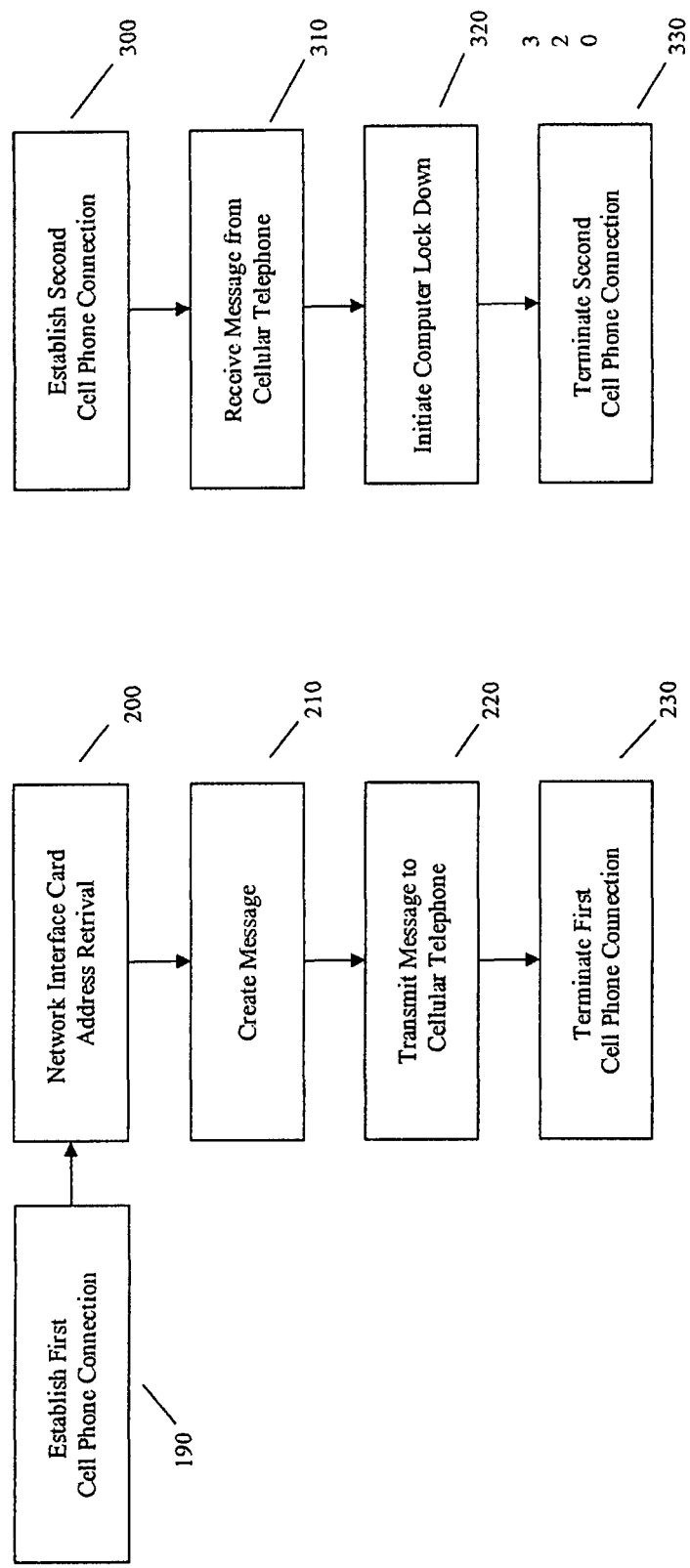
FIG. 2 is a conceptual flow chart of the sequence of operations for accomplishing remote computer shut down.

As shown in FIG. 2, a communications connection is established 190 between the computer 100 and the remote command device 70. The NIC address retrieval algorithm 200 is run and obtains the address of the network interface card. As a next step, the remote lock-down message formatting algorithm 210 is run. A message is prepared, in accordance with a pre-determined format including a prescribed preamble, the address of the computer's network interface card, and additional data to specify the desired command action and, optionally, a security password. One example of an acceptable message format is the Magic Packet. The Magic Packet is a broadcast frame having a configuration comprising a defined constant followed by sixteen repetitions of the target computers network interface card address possibly followed by a four or six byte password. A common application of Magic Packet technology is the remote commanding of computer states.

Having prepared the message, a communications link is established with the remote command device and the message is uploaded 220 to a memory in the command device. The communications link may be hardwired to the remote command device or may alternatively be wirelessly dialed up using public telephone system access. At the conclusion of the upload process, the communication link may be terminated 230.

In an embodiment, the remote computer lock-down process commences when the computer 100 is accessed 300 by the remote command device 70. A communications link connection is made and the previously stored formatted message is transmitted 310 from the remote command device to the computer, thus initiating computer lock down 320. If the computer is in the S3 (suspend) state, the computer is awakened and immediately commanded to transition to the S4 (hibernate) state. The Magic Packet technology may be utilized to perform the awakening from the S3 state. If in the S0 (operating system running) state, the computer is commanded to transition into the S4 (hibernate) state. If the computer is already either in the S4 (hibernate) or S5 (off) state, the message is ignored and the current security policy is continued. The final step of the process is termination 330 of the remote command device connection.

In a further embodiment, the remote computer lock-down system may be further may be enhanced to provide greater functionality. Additional command message data may be included to execution of additional security algorithmic processes. In this embodiment, the computer's BIOS further participates in the lock-down process. As an example, when the command message is received, a bit (WOLBit) could be set indicating message receipt. During subsequent POST (pre-operation system test), the BIOS would query the WOLBit and, if set, would enforce an additional security policy (AdminBit). This could enable a requirement that the admin password be entered to unlock the computer system. Specifically, the BIOS must include software to select if the admin password will be required to do a successful boot after the lock-down command message has been received. In addition the BIOS must provide for an additional bit (WLO-Bit) to keep track of the message received event, software to enable WLAN wake from the S5 (off state, and software to clear the WLAN bit after a successful boot. Application software must also be included to set the WLOBit when the message is received.

In accordance with this embodiment, if the computer is initially in the S3 (suspend) state, the receipt of the command message causes the system to transition to the S0 (operating system running) followed by the setting of the WOLBit and then, finally, transitioning to the S4 (hibernate) state. If the computer is initially in the S0 (operating system running) state, the WLOBit would be set followed by transition to the S4 (hibernate) state.

In a further extension of the embodiment, additional BIOS setup features will be added which, for example, allows the remote setting of the HDPW (hard file password) when the (WOLBit) is set, if no password is already set. In accordance with this embodiment, the hardfile password (HDP) and the (WOLBit) are checked. If (HDP) is not set and (WOLBit) is set then the (AdminBit) is checked. If the (AdminBit) is set then the hardfile password, HDPW, is set to the Admin password (PAP). Alternatively, if the (AdminBit) is not set then the hardfile password, HDPW, is set to the User password (POP). Once the appropriate password has been successfully entered, the software clears the WOLBit and allows the user/administrator to clear the HDPW. A logic constraint is provided where, if the hardfile password (HDPW) is set, the HDPWBit cannot be set. Any attempt to do so will result in the generation of a warning message.

Statement Regarding Preferred Embodiments

While the invention has been described with respect to preferred embodiments, those skilled in the art will readily appreciate that various changes and/or modifications can be made to the invention without departing from the spirit or scope of the invention as defined by the appended claims. All documents cited herein are incorporated by reference herein where appropriate for teachings of additional or alternative details, features and/or technical background.

What is claimed is:

1. A method comprising:
preparing a message at a personal computing system, said message comprising a unique code based on an address of a hardware component associated with the personal computing system and data specifying a desired lock-down command action;
establishing a communications link between said personal computing system and a cellular telephone;
uploading said message to said cellular telephone;
thereafter receiving, at the personal computing system, data comprising said message from the cellular telephone by way of a network; and
locking-down said personal computing system in response to receipt of said message comprising said unique code associated with said personal computing system and said desired lockdown command action:
said locking-down comprising:
responsive to the personal computing system receiving said message in a running state, transitioning into a password protected state; and
responsive to the personal computing system receiving said message in a suspended state, awakening the personal computing system and thereafter transitioning to a password protected state.

2. The method as described by claim 1 wherein said message is formatted in accordance with one of the group consisting of a Magic Packet and a short text message.

3. The method as described by claim 1 wherein said locking-down comprises a transition from a S0 (operating system running) state to a state chosen from a group consisting of S4 (hibernate) state and S5 (off) state.

4. The method as described by claim 1 wherein said locking-down comprises transitioning from an S3 (suspend) state initially to an S0 (operating system running) state, and subsequently to a state chosen from a group consisting of S4 (hibernate) state and S5 (off) state.

5. The method as described by claim 1, further comprising:
determining that said message includes an instruction specifying a security policy to be followed for restarting of said personal computing system;
setting a flag signifying that said instruction has be received; and
implementing said security policy.

6. The method in accordance with claim 5 where said security policy requires use of security password to restart said personal computing system.

7. The method in accordance with claim 5 where said security policy provides for remote setting of a security password.

8. Apparatus comprising:
an electronic memory which stores data and executable software code;
a network interface card that has an address and can detect a message;
a processor, operatively coupled to said electronic memory and to said network interface card, and that executes said executable software code that:
prepares and uploads, to a cellular telephone, a message comprising a unique code based on the address and data specifying a desired lockdown command action;

determines that data comprising said message has been received from said cellular telephone after said message has been prepared and uploaded to the cellular telephone; and locks-down the apparatus in response to receipt of said message comprising said unique code associated with said network interface card and said desired lockdown command action:

wherein the apparatus locks-down by:

responsive to the apparatus receiving said message in a running state, transitioning into a password protected state; and responsive to the apparatus receiving said message in a suspended state, awakening the apparatus and thereafter transitioning to a password protected state.

9. Apparatus, in accordance with claim 8, where said processor further:

determines that said message includes an instruction specifying security policy to be followed for restarting of said apparatus;

sets a flag signifying that said remotely transmitted message has been received; and implements said security policy.

10. Apparatus, in accordance with claim 8, where said security policy requires use of security password to restart said apparatus.

11. Apparatus, in accordance with claim 8, where said security policy provides for remote setting of security password.

12. A computer-usable memory device having computer readable instructions stored thereon, for execution by a processor, to:

prepare a message at a personal computing system, said message comprising a unique code based on an address of a hardware component associated with the personal computing system and data specifying desired lockdown command action;

establish a communications link between said personal computing system and cellular telephone;

upload said message to said cellular telephone;

thereafter receive, at the personal computing system, data comprising said message from the cellular telephone by way of a network; and lock-down said personal computing system in response to receipt of said message comprising said unique code associated with said personal computing system and said desired lockdown command action:

said lock-down comprising:

responsive to the personal computing system receiving said message in a running state, transitioning into a password protected state; and responsive to the personal computing system receiving said message in a suspended state, awakening the personal computing system and thereafter transitioning to a password protected state.

13. A computer-usable memory device, in accordance with claim 12, wherein said lock-down comprises transitioning from a S0 (operating system running) state to a state chosen from a group consisting of S4 (hibernate) state and S5 (off) state.

14. A computer-usable memory device, in accordance with claim 12, wherein said lock-down comprises transitioning from an S3 (suspend) state initially to an S0 (operating system running) state, and subsequently to a state chosen from a group consisting of S4 (hibernate) state and S5 (off) state.

15. A computer-usable memory device, in accordance with claim 12, wherein said computer readable instructions are further executable by the processor to determine that said remotely transmitted message includes an instruction specifying a security policy to be followed for restarting of said personal computing system;

set a flag signifying that said instruction has been received; and in response to said flag, implement said security policy.

16. A computer-usable memory device, in accordance with claim 15, wherein said security policy requires use of security password to restart said personal computing system.

17. A computer-usable memory device, in accordance with claim 15, wherein said security policy provides for remote setting of security password.

* * * * *